(12) United States Patent
Domingues et al.

(10) Patent No.: US 9,181,011 B2
(45) Date of Patent: Nov. 10, 2015

(54) DOUGH PRODUCT AND VENTED PACKAGE

(75) Inventors: David J Domingues, Plymouth, MN (US); Claire Thurbush, Minneapolis, MN (US); David A. Kirk, Coon Rapids, MN (US); Todd Purkey, Apple Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 1797 days.

(21) Appl. No.: 12/306,745

(22) PCT Filed: Jul. 11, 2007

(86) PCT No.: PCT/US2007/073200
§ 371 (c)(1),
(2), (4) Date: Aug. 24, 2009

(87) PCT Pub. No.: WO2008/008804
PCT Pub. Date: Jan. 17, 2008

(65) Prior Publication Data
US 2010/0021591 A1    Jan. 28, 2010

Related U.S. Application Data

(60) Provisional application No. 60/820,000, filed on Jul. 11, 2006.

(51) Int. Cl.
*B65D 75/20* (2006.01)
*A21D 6/00* (2006.01)
*A21D 10/02* (2006.01)

(52) U.S. Cl.
CPC .............. *B65D 75/20* (2013.01); *A21D 6/001* (2013.01); *A21D 10/025* (2013.01); *B65D 2205/02* (2013.01); *B65D 2585/36* (2013.01)

(58) Field of Classification Search
CPC .............. B65D 75/20; B65D 2205/02; B65D 2585/36; A21D 6/001; A21D 10/025
USPC .......................................... 426/118, 395, 128
See application file for complete search history.

(56) References Cited

U.S. PATENT DOCUMENTS

| | | | |
|---|---|---|---|
| 4,769,245 A * | 9/1988 | Farrar et al. | 426/106 |
| 4,857,342 A | 8/1989 | Kappes | |
| 4,966,780 A | 10/1990 | Hargraves et al. | |
| 5,314,702 A | 5/1994 | Lewandowski et al. | |
| 5,650,183 A | 7/1997 | Domingues | |
| 5,759,596 A | 6/1998 | Domingues et al. | |
| 5,798,256 A | 8/1998 | Domingues | |
| 5,939,109 A | 8/1999 | Domingues et al. | |
| 6,113,269 A | 9/2000 | DeMatteis et al. | |
| 6,286,681 B1 | 9/2001 | Wilfong, Jr. et al. | |
| 6,602,529 B1 | 8/2003 | Lonergan et al. | |
| 7,235,274 B2 | 6/2007 | Archibald et al. | |
| 2003/0049358 A1 | 3/2003 | Domingues | |
| 2004/0213956 A1 | 10/2004 | Stroud, Jr. et al. | |
| 2004/0241292 A1 | 12/2004 | Geng et al. | |
| 2005/0269386 A1 | 12/2005 | Fisher et al. | |
| 2005/0271773 A1 | 12/2005 | Domingues | |
| 2005/0281922 A1 | 12/2005 | Domingues | |

FOREIGN PATENT DOCUMENTS

| | | |
|---|---|---|
| WO | WO 02/28746 A1 | 4/2002 |
| WO | WO 2008/008804 A2 | 1/2008 |

* cited by examiner

*Primary Examiner* — Rena L Dye
*Assistant Examiner* — Chaim Smith
(74) *Attorney, Agent, or Firm* — Diederiks & Whitelaw, PLC; John L. Crimmins

(57) ABSTRACT

Described are dough packages and packaged dough products, wherein the package includes microvents.

12 Claims, 7 Drawing Sheets

DOUGH PRODUCT AND VENTED PACKAGE

CROSS REFERENCE TO RELATED APPLICATIONS

The present application represents a National Stage application of PCT/US2007/0073200 entitled "Dough Product and Vented Package" filed Jul. 11, 2007, which claims the benefit of U.S. Provisional Application Ser. No. 60/820,000 filed Jul. 11, 2006 entitled "Dough Procut and Vented Package", the entire disclosures of which are incorporated herein by reference.

FIELD OF THE INVENTION

The invention relates to dough packages and packaged dough products that involve a composition in a vented package, wherein the package includes microvents. The dough composition may be refrigerated or frozen, proofed or unproofed, developed, non-developed, etc. The invention also includes related methods of packaging and processing that allow proofing of a dough composition inside of the package.

BACKGROUND

A wide variety of leavenable dough products allow a user to "home bake" a dough to produce a desirable hot, fresh-baked item. Many such items are proofed prior to baking, and for consumer convenience may be partially or fully proofed prior to purchase and prior to use by the consumer. Such products, sold after proofing or partial proofing, are examples of products referred to as "pre-proofed." Examples of pre-proofed dough products include breads and bread-like products that generally contain a leavening ingredient and include but are not limited to loaves of bread such as French bread, white or whole wheat bread, bread sticks, biscuits, rolls, pizza dough, and the like.

One technique for preparing a pre-proofed dough product is by use of a package having a fixed volume and allowing a contained dough composition to proof and expand inside of the packaging, e.g., self-sealing packages such as canisters. Such products include dough formulations that can be, but are not necessarily, chemically-leavenable. For example, one way to accommodate proofing of a dough composition during refrigerated storage is to store a refrigerated dough composition in a canister of a fixed volume so the refrigerated dough product proofs or partially proofs inside of the canister. With expansion of the dough composition, the dough volume increases to fill the entire package volume, and upon further expansion will increase the pressure inside the canister. The canister is usually formed from composite paperboard spirally wound into a cylinder. The initial volume of dough packed into the canister is usually less than the canister volume and as the dough continues to proof, the pressure increases to force the dough against canister end caps to seal gas passages around the end caps of the canister.

Another form of packaging for food products, including those that may be refrigerated or frozen, is flexible packaging such as packages known in the food industry as "chubs," or packages known as "pouches." A pouch is generally a non-pressurized flexible package prepared from a sealed flexible film. A chub may usually include a cylindrical or tubular package of thin flexible material formed to contain a quantity of food item. Tubular package ends may be closed by any appropriate mechanical fastener such as crimped clips. International Publication Number WO 02/28746, for example, describes dough products packaged in chubs. Packaging of proofed refrigerated dough in flexible film containers, as well as other types of containers, often includes the use of a valve to vent carbon dioxide gas from the package headspace. These valves are prone to fouling and can be expensive. See also U.S. Pat. No. 6,602,529, "High Raw Specific Volume Dough in a Chub," filed Oct. 2, 2000.

There is continuing need for new types of packaged pre-proofed dough products that may be refrigerator stable or freezer stable. Similarly, there is continuing need for new methods of packaging and preparing such packaged dough products. Particularly useful and economical packages are those that are simple and durable, such as flexible film packaging with no pressure release valve.

SUMMARY

The invention relates to dough packages that include microvents, such as a chub, cylinder (e.g., can or canister), pouch, etc. The invention additionally relates to packaged dough products such as unproofed, proofed, and pre-proofed (e.g., partially proofed) packaged dough products, as well as methods of packaging, proofing, storing, and preparing the same.

Packages of the invention are dough product packages that include microvents, such as a flexible, rigid, or semi-rigid dough package, any one of which includes microvents. The microvents are channels, holes, apertures, perforations, pores, or the like, that allow gas contained by interior space of a closed package to be expelled from that interior space. Gases such as carbon dioxide, oxygen, or an inert gas (e.g., from flushing) may be present at the package interior due to packaging and processing history or due to proofing of the packaged dough composition and attendant production of carbon dioxide by a dough leavening system. A dough may also produce carbon dioxide and experience expansion within the package by proofing or partial proofing after being inserted into the package. Any gas contained in the interior space of the package during dough expansion is desirably expelled to give the expanding dough the space needed to expand into the internal volume of the package.

According to the invention, microvents allow gas to be expelled from the package interior upon expansion of the dough within the package, to allow the expanding dough to fill the internal package volume, optionally to eliminate headspace gas present within the package prior to dough expansion. The expanded dough can also contact the microvents from the interior side of the package to seal the microvents from the inside of the package and substantially prevent further passage of gases through the microvents either into or out of the package interior. Further proofing and expansion of the dough within the package may cause the dough to produce an increased pressure within the interior space of the package.

According to certain specific embodiments, a dough can be packaged to favor expansion of the dough over diffusional loss of leavening gas, by reducing or minimizing exposed dough surface area; e.g., causing surface area of an unproofed packaged dough composition to contact a gas-impermeable dough packaging material instead of being exposed to free interior space of a package. An unproofed dough surface can be placed into contact with a dough packaging material to allow the packaging material to act as a leavening gas barrier that keeps leavening gas such as carbon dioxide internal to the dough, allowing the gas to cause the dough to expand. Exposed areas of a dough surface, in contrast, allow leavening gas to exit the dough and be expelled into free space within the volume of a package where the gas may be vented. The escaped gas does not contribute to leavening of the dough. An example of a desired amount of dough surface that contacts a leavening gas (e.g., carbon dioxide)-impermeable packaging material instead of being exposed to internal package volume, can be at least ⅔ of the dough surface, e.g., at least 80 percent of the dough surface.

The package can be of flexible, rigid, or semi-rigid packaging material, or a combination of these, and may include material impermeable to gases such as oxygen, carbon dioxide, water vapor, etc. Exemplary flexible materials include flexible polymeric films including those that are presently known or that may be developed in the future for use in packaging dough compositions.

Exemplary packages include microvents at positions that allow the dough to expand from within and fill the space near the microvents after other spaces have been filled by the expanding dough, to result in minimal headspace, e.g., less than 5 percent or less than 1 percent headspace. Particular examples of package configurations include a chub or tube made from one or multiple pieces of flexible film, sealed at ends or around a perimeter. Other examples include rigid or semi-rigid cylindrical cans or canisters with end caps. The can or cylinder may be made of any desirable material such as paper, cardboard, plastic or another polymeric material. End caps may also be made of any useful material such as cardboard, paper, foil, metal, metal coated paper, plastic, or another polymeric material. A cylinder may include microvents at any location of the cylinder or the end caps, such as toward each end of the cylinder, or at the end caps.

The dough composition can be any type of leavenable dough composition, e.g., a proofed or unproofed dough composition that is storage-stable at refrigerated or frozen storage temperature. The dough composition can be leavenable by action of yeast or chemical leavening agents. Examples of useful types of dough compositions include chemically-leavenable biscuits, breads, and bread-like dough compositions including French bread, bread rolls, croissants, sweet rolls, pizza crust.

Certain embodiments of the invention include a dough composition packaged in a low pressure flexible package, optionally and preferably with little or no headspace. A low pressure package can mean a package that is substantially air tight, with an internal pressure that is typically less than 15 psig (pounds per square inch, gauge) (gauge pressure is absolute pressure minus atmospheric pressure, i.e., psig is psi absolute minus approximately 1 atmosphere or 14.7 psi; for example a gauge pressure of 0 psig inside a package is a pressure of approximately 1 atmosphere). Examples of low pressure packages include canisters, chubs, and pouches that do not exhibit a pressurized (greater than 15 psig) interior. A dislike of consumers with the use of certain current pressurized refrigerator-stable dough products is that pressurized packages can pop when opened. Advantageously, packaging systems of the invention can avoid this popping, because the internal pressure does not build to the same levels of the current consumer products that do pop when opened.

Methods of the invention can involve placing unproofed dough into a package that includes microvents and allowing the dough to expand while proofing or partially proofing inside of the package. The package may optionally be flushed with carbon dioxide, or an inert gas such as nitrogen, during a step of placing the dough into a package. The dough, within the package, can increase in size by expansion due to a leavening agent, to take up interior space of the package, while the expanding dough causes gases inside of the package to be expelled through the microvents. In certain embodiments the microvents can be placed at locations on the package to result in limited headspace in the package after the dough expands, preferably very little or no headspace. "Headspace" refers to the internal volume within a package that is not taken up by dough composition; i.e., the internal volume as packaged not including the dough product. The headspace of a packaged dough composition described herein can be, e.g., less than about 10 percent of the total internal volume of the packaged product, such as less than 5 percent, less than 3 percent, or less than 1 percent of the total internal package volume.

Other embodiments of methods of the invention allow for preparation of a packaged dough composition wherein the product is refrigerator stable, the package exhibits a desired internal pressure after expansion of the dough, and the expanded dough contained in the package exhibits a desired raw specific volume (when measured inside the package). Such methods include first providing an amount of a dough having predictable refrigerated leavening properties and a package of known volume (i.e., known maximum volume, which refers to the expanded package volume without substantial stretching of the package, e.g., less than 5 percent, or less than 3 percent stretching based on total internal volume). The amount of dough per a package volume can be selected to result in a desired raw specific volume upon expansion of the dough within the package, based on factors such as: the predictable leaving properties of the dough (e.g., the amount of carbon dioxide that will be produced during refrigerated storage and the amount of dough expansion that will occur by volume); the desired raw specific volume of the after expansion and within the package; and the desired internal pressure of the dough upon expansion. Exemplary packaged dough products of the invention can be designed to produce a packaged product of a dough with a desired raw specific volume as measured inside the package (e.g., from 1.5 to 2.0 cc/gram), and a package having an internal pressure within a desired range (e.g., 1 to 15 psig).

The invention allows a dough composition to expand, e.g., proof or partially proof, inside of a package. This advantageously reduces steps of handling the dough composition that would otherwise be required if the dough composition were first proofed or partially proofed outside of the package, and then placed into a package in an expanded condition. Additionally, proofing or partially proofing after packaging may reduce or eliminate potential contamination of a dough product.

In different embodiments, a dough may be packaged and stored at refrigerated or frozen conditions, proofed or unproofed. A dough may for example be packaged in an unproofed condition and refrigerated, with the dough proofing during refrigerated storage following packaging. Alternately, a dough may be packaged in an unproofed condition, then frozen before being proofed; the dough may be stored and optionally shipped and sold in the unproofed frozen state, then thawed, after which the dough can proof within the package.

As used in the present description, "proof" and "proofing" relate to a step before baking of a dough composition that allows at least partial expansion (i.e., at least partial proofing) of a dough composition by giving time to allow yeast or chemical leavening agents to produce leavening gas that forms bubbles within the dough composition and thereby expands the dough composition to a desired volume.

"Pre-proofed" means that a dough product does not require a proofing step after removal from refrigerated or frozen storage, prior to cooking, e.g., baking.

The term "unproofed" is used as generally understood in the dough and baking arts, e.g., to refer to a dough composition that has not been processed to include timing intended to cause or allow proofing or intentional leavening of a dough composition. For example, a dough composition may not have been subjected to a specific holding stage for causing the volume of the dough to increase by 10% or more.

An aspect of the invention relates to a packaged raw dough product that includes a raw dough composition contained in a package, the package comprising microvents.

Another aspect of the invention relates to a method of producing a packaged dough product. The method includes providing a dough composition, providing a package that contains microvents, placing the dough composition into the package, and allowing the dough composition to expand within the package, gases within the package being expelled through the microvents.

Another aspect of the invention relates to a method of preparing a packaged dough composition. The method includes: providing a package of having an internal volume and microvents, placing into the package an amount of unleavened dough composition, the amount having a volume of from 50 to 80 percent of the internal package volume, allowing the dough to expand within the package during refrigerated storage to a raw specific volume in the range from 1.5 to 2.0 cubic centimeters per gram, with gases internal to the package being expelled through the microvents, and with the internal package pressure building to a pressure in the range from 1 to 15 pounds per square inch (gauge).

Another aspect of the invention relates to a dough package that includes a flexible film that contains microvents.

DETAILED DESCRIPTION

Figure 1:
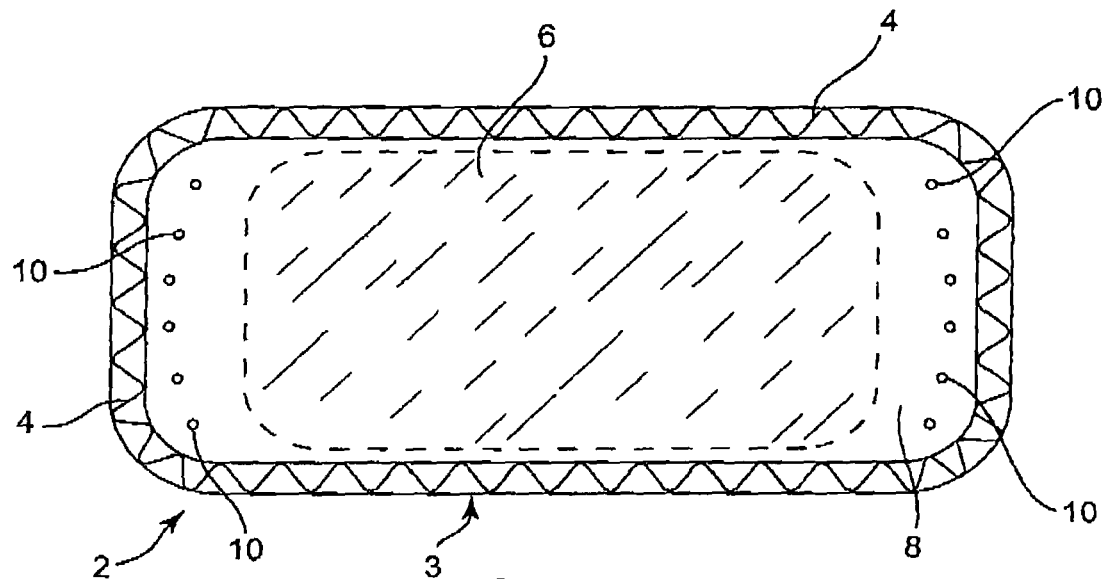
FIG. 1 is a top view of a packaged dough product of the invention, wherein an unproofed dough has been placed in a package having microvents.

Packages according to the invention include microvents that allow gas contained in an interior space of a closed package to be expelled from the interior of the package to the exterior, such as upon expansion of a dough composition within the package. With the expansion of a dough composition within the package, the size (volume) of the dough can increase to fill the internal package volume, displacing gas. According to the invention, the expanded dough can also contact the microvents to seal the microvents from inside of the package and prevent further passage of gases through the microvents in either direction. Any further proofing and expansion of the dough due to production of carbon dioxide within the dough by a leavening system (yeast or chemical leavening agents) will cause the dough to further pressurize the interior of the package.

The package form may be any form that can be prepared to include microvents as described herein. Examples include conventional types of dough packages that have been modified from their conventional forms to include microvents. These specifically include package designs known in the dough arts, such as for use with refrigerated chemically leavened dough compositions, such as cans, canisters, chubs, pouches, and the like, modified to include microvents.

The package may be of various flexible, rigid, semi-rigid designs and materials, such as packages referred to in the dough and food product arts as pouch, chub, can, or canister packages.

A "pouch"-type package is generally a flexible package prepared from a sealed flexible film. A chub usually includes a cylindrical or tubular package (elongate) of flexible packaging material formed to contain a quantity of food item. Tubular package ends may be closed by any appropriate mechanical fastener such as crimped clips. International Publication Number WO 02/28746, for example, discusses dough products packaged in chubs.

Another package form that can be useful with microvents is a can or canister (sometimes referred to collectively herein as "can") having a fixed volume (e.g., cylindrical) and allowing a contained dough composition to expand from within the package to expel gas and optionally build a desired interior pressure. A can or canister-type packages can be sealed on each of two ends with a cap, foil, polymer, paper, lid, membrane seal, or other end seal, which may be secured to the cylinder by any useful technique such as heat sealing, adhesive, or the like. With expansion of the dough composition inside of the cylinder, the dough volume increases to fill the entire fixed volume, and upon any further proofing the pressure inside the cylinder will increase and, according to the invention, the dough will also seal microvents from inside.

A canister can be formed from any of a selection of useful materials such as paper, cardboard (e.g., wound, flat, convolute, etc.), plastic, and multilayer composites that include one or more of these materials optionally additionally including additional layers such as a metal layer or other barrier layer. A canister may be formed as desired. For example, a plastic canister may be formed by molding, e.g., blow molding, injection molding, etc. A composite paper board canister may be spirally wound into a cylinder, from plastic, or from another type of rigid, semi-rigid, or flexible material capable of being so formed and then sealed to contain a dough composition. This "can" embodiment is discussed in terms of a cylindrical package, but other shapes can also be useful and are contemplated according to the invention, such shapes including elongate square, hexagonal, octagonal, rhombus, rectangle, or other geometry with ends and end caps or other type of seals. The canister may be rigid or semi-rigid in an elongate direction and sealed at one or more ends with one or more end cap or seal.

Microvents are apertures, holes, orifices, or channels, at any desired location of a package, package component (e.g., end cap) or packaging material, that that allow passage of a gas and that include a feature dimension that is on a micron scale. A microvent can be of a size that allows a gas to pass through the microvent and be expelled through the microvent from the inside to the exterior of a package, such as upon expansion of the dough inside the package. A microvent can also be of a size that can be sealed from the interior side of a package upon expansion of the dough and contact between the expanded dough and the interior surface of the package to cover a microvent and prevent further passage of gases into or out of the package. Further desirably and optionally, a microvent may be of a size (e.g., area) that does not allow an expanding or expanded dough to flow through the microvent from a package interior to a package exterior. A microvent can optionally exhibit dimension, shape, and overall form that do not result in undue discoloration of the dough at a microvent, that do not allow mold to either germinate or grow on a dough surface exposed at microvent to an exterior atmosphere, or both.

Exemplary microvents may include a feature dimension (e.g., a diameter) in the range between 10 to 400 microns, (e.g., from 50 to 300 microns or from 50 to 200 microns) which in inches is from 0.00039 to 0.0157 inch (1 micron=0.00003937 inch). A range of diameter of substantially circular laser-formed holes found to be useful to inhibit or prevent mold formation is in the range from 0.002 to 0.016 inch diameters. This range of microvent diameters was found to not result in mold formation at the microvents, when a film perforated with this size microvent was placed onto a mycological agar (acidified with 10 percent lactic acid) plate inoculated with a variety of bread mold spores and incubated at 77° F. (25° C.) for 12 days.

Another useful range may be from 0.0004 to 0.0065 inch, or 10 microns to about 165 microns.

A dough exposed to an exterior atmosphere at an open area of a microvent may potentially experience a degree of an undesired effect due to exposure to exterior atmosphere, such as drying, as in "caulking" of the dough at the area of a microvent aperture. This drying or caulking effect is involved in the sealing of the microvent aperture and the package by the contained dough composition. While a minimal degree of drying or caulking of exposed dough may occur, other more material effects on the dough such as substantial discoloration (e.g., discoloration that is perceptible to the ordinary unaided eye), mold germination, or mold growth, or all three of these effects, may be avoided with selection of microvent dimension, shape, and overall form, that reduce or eliminate these effects or at least the materiality or visibility of these effects.

An exemplary form of a microvent may be a pore or aperture that is present or created in a sheet-type of a packaging material such as a sheet of plastic, another polymeric material, paper, cardboard, foil, metal, metal-coated paper, and the like. A "sheet," as will be understood, can be a relatively flat and two-dimensional material in the form of a strip, page, continuous rolled material, and the like, before or after forming the material into a package. The microvent may be created in a sheet by any useful technique, with a useful technique being potentially based on the particular type and material of the sheet. For a flexible polymer, useful methods may include molding the aperture during formation; burning by a laser (e.g., laser drilling); or cutting, burning, or otherwise forming the aperture. For metals, foils, cardboard, etc., useful method may be laser drilling.

A microvent may alternately be in the form of a three-dimensional microchannel in a seam of a package formed from two pieces of material of a package. A microchannel can be considered a channel or three-dimensional opening that includes a two-dimensional cross-sectional dimension having a feature on a micron scale (e.g., a diameter on the micron scale), and a length that may or may not be of a micron scale. A microchannel may be produced by known methods, or methods developed in the future. By one exemplary method, a microchannel may be prepared at a seam formed by two pieces of flexible film material, by placing an obstruction having at least one dimension of a micron-scale between the pieces of material and then molding or sealing the package pieces together around the obstruction. An example of an obstruction can be a wire (e.g., metal) having a cross-sectional diameter of a micron-scale, and having any useful length. After forming a seal around the obstruction, the obstruction can be removed (e.g., wire can be pulled out from between the two pieces of material) to leave a channel having a size (e.g., diameter), shape, and form based on the obstruction, in this case a microchannel form of a microvent having a diameter on the micron scale, and any useful and desired length.

One or more microvents can be placed at locations on a package that will allow internal gases to be vented externally. Desirably, microvents can be placed to allow expansion of the dough within the package to completely or substantially completely fill the internal volume of the package and reduce or substantially eliminate headspace. Placement of microvents at locations that access a package interior space into which a dough expands last, can allow for expansion of the dough to completely fill the interior space. As an example, a flexible chub package may generally include an oblong shape, which means that at least one dimension (e.g., length) is greater than another (e.g., width). Similarly, a can-type package may exhibit a cylindrical shape having an elongate form with a length-wise dimension that is greater than a width or height. Other packaging designs may include also include similar elongate shapes, that include a length that is greater than a width or height. Microvents can be located at or adjacent one or two ends of an length of an elongate dimension, e.g., at ends of oblong, cylindrical, or tube-shaped package. This location for microvents allows a dough to expand within the center of the package first, fill the ends of the greater length dimension later, and lastly seal the microvents from within the package, with this series of dough expansion producing reduced or minimized headspace.

The exact distance between microvents and an end of the package can depend on factors such as the type of dough, the total package volume, the exact form of the fully-expanded package, etc. As an example, a microvent may be located within the terminal 20, 10, or 5 percent of the total length of an lengthwise-dimension of a package interior space. For a flexible package, the distance can be measured with the flexible package lying substantially flat. The measurement may be from a seam, end cap, or other closure at an end of the package. As a specific example, for a package that includes an interior space having a length of 10 inches when lying flat, microvents may be located within 2, 1, or 0.5 inches of an end of the interior space of the flat package, for these embodiments.

Exemplary packages for dough composition such as sweet rolls, breads, rolls, biscuits, and others, may have dimensions that include an expanded internal volume in the range from 50 to 500 cubic centimeters, e.g., to contain from 1 to 10 chemically leavened biscuits dough pucks, although volumes outside of this range may also be useful for biscuit or other dough products. An exemplary length-wise dimension of an elongate chub, tube, or can, may be in the range from 10 to 18 centimeters; and a width or cross-sectional diameter may be in the range from 5 to 10 centimeters.

According to exemplary products of the invention, the expanded dough will contact microvents and close or seal the microvents from inside by expanding against the microvents and contacting the aperture. This seals the package from inside and any further expansion of the dough from inside may create a desired internal pressure.

A dough composition can be formulated, in combination with selection of a size of an internal volume of a package and an amount (e.g., volume) of dough to be contained within the package, such that upon expansion of the dough within the package a desired internal pressure is achieved. An exemplary pressure can be in the range from 1 to 15 pounds per square inch, gauge (psig), such as within the range from 5 to 10 psig. The dough expands to partially proof or proof within the package to a desired raw specific volume. An example of a partially proofed or pre-proofed dough may be a chemically leavened dough having an expanded raw specific volume in the range from 1.5 to 2.0 cubic centimeters per gram as measured inside of the package. According to exemplary dough products, a dough can proof from an unproofed to a proofed condition within a time that prevents the dough from suffering any cosmetic deficiencies such as discoloration; for example a dough may proof within the package in a time of less than 24 hours.

A package and components of a package may be of any useful package or packaging material, including flexible packaging materials as are known in the food and dough packaging arts, metals, cardboard, paper, etc., as described herein. Exemplary packages can be cans that include rigid or semi-rigid materials such as paper, cardboard, and metal. Other exemplary packages can be in the form of a chub or a pouch, made of at least one flexible material that, other than through microvents, is impermeable to gases such as oxygen, carbon dioxide, water vapor, etc. Flexible refers to the ability of a packaging material to bend, fold, wrinkle, and change shape as described herein, and does not require the material to stretch.

Specific examples of flexible packaging materials that can be used according to the present description as gas (e.g., carbon dioxide, oxygen, etc.) barrier materials include saran, a metal layer, a glass layer (e.g., silicon dioxide), polymeric or fibrous materials such as different types of polyesters (e.g., PET), nylons, polyolefins (e.g., polyethylene, polypropylene, etc.), vinyls, polyalcohols, EVOH, etc., as are presently known or developed in the future.

Exemplary thermoplastics, e.g., for sealing layer or other layer include thermoplastic polymer materials such low temperature melt point polymers, e.g., polyolefins such as LLDPE (linear low density polyethylene), LDPE (low density polyethylene), or copolymers of either of these with other polymers, e.g., copolymers of LLDPE or LDPE with EVA (ethylene vinyl acetate).

Exemplary flexible film materials can be continuous single or multi-layer films that are flexible and impermeable to gases such as oxygen, carbon dioxide, water vapor, or combinations of these. A substantially air tight flexible packaging can be prepared from materials such as polymeric materials or foils, with especially preferred materials including multi-layer polymeric (e.g., plastic) films. For example, a flexible packaging film may include multiple layers including a sealant layer and an oxygen barrier layer.

Different pieces of a package, whether polymeric, metal, paper, coated paper, cardboard, or the like, can be bonded together to form a total package by any known method, as will be appreciated. Examples of useful bonding methods include thermal bonding methods, such as by bonding thermoplastic methods by melting using pressure and temperature. Other useful bonding methods can include the use of adhesive, such as food-grade adhesives.

An example of a packaged dough product as described, that includes a flexible packaging material containing microvents, and containing a dough composition, is at FIG. 1. Packaged dough product 2 includes package 3 of two pieces of flexible film material sealed at seal 4 around the perimeter of package 3. The interior of package 3 includes dough composition 6 (dashed lines and shading) and headspace 8. Microvents 10 are located at or adjacent to the ends of oblong or tube-shaped package 3. This can mean, for example that microvents 10 at each end of package 3 are located at the opposite ends and within the final 10 percent or 5 percent of the total length of the tube, giving dough 6 the required amount of space to expand into the ends of package 3 before microvents become sealed by expanding dough 6. Microvents 10 are placed at the ends of package 2 because dough composition 6 is located centrally in package 3, between the ends, and will expand to fill the ends of package 2 last, allowing gas from headspace 8 to be expelled as dough 6 expands to fill the end volumes of package 2. Twelve microvents (10) (six at each end of package 3) are illustrated, but the number may be more or fewer. While package 3 is illustrated to be oblong or rectangular, any other shape can be suitable, such as circular, square, etc. Similarly, package 3 includes only a single dough piece, but multiple pieces may be placed in the package according to the invention.

Not shown in FIG. 1 is an optional mechanism for opening packaged dough product 3. The package of FIG. 1 can include any mechanism for opening the package. An example is a tab that can be pulled to cut or tear an opening along a length of the package, for removal of the dough product through the opening formed by pulling the tab.

Figure 2:
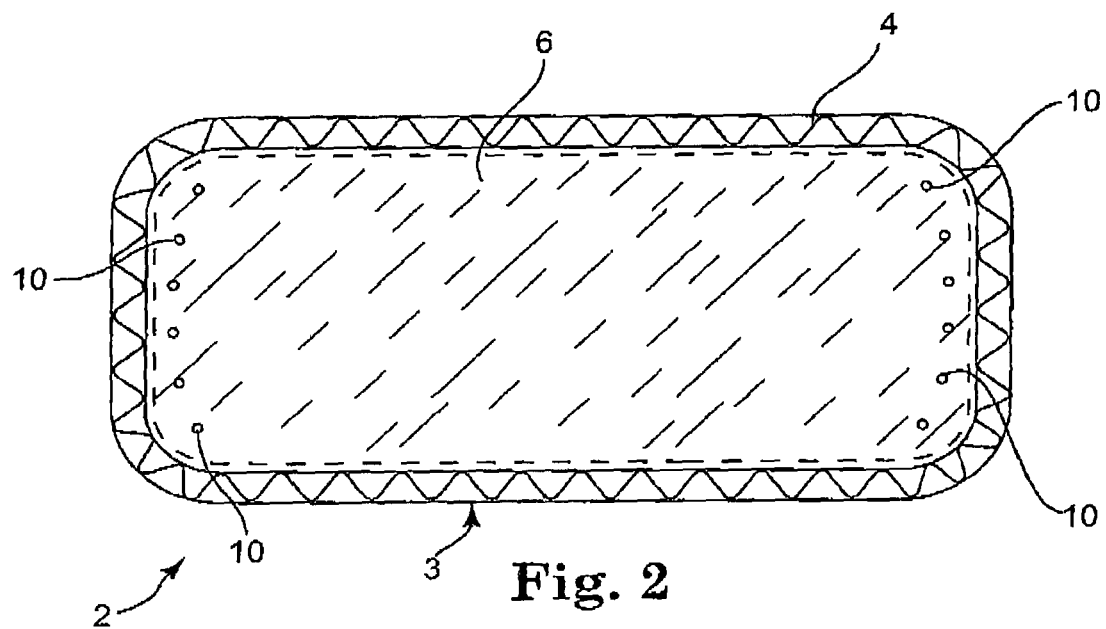
FIG. 2 is a top view of a product of the invention wherein an expanded dough is contained within a package having microvents.
Figure 2A:
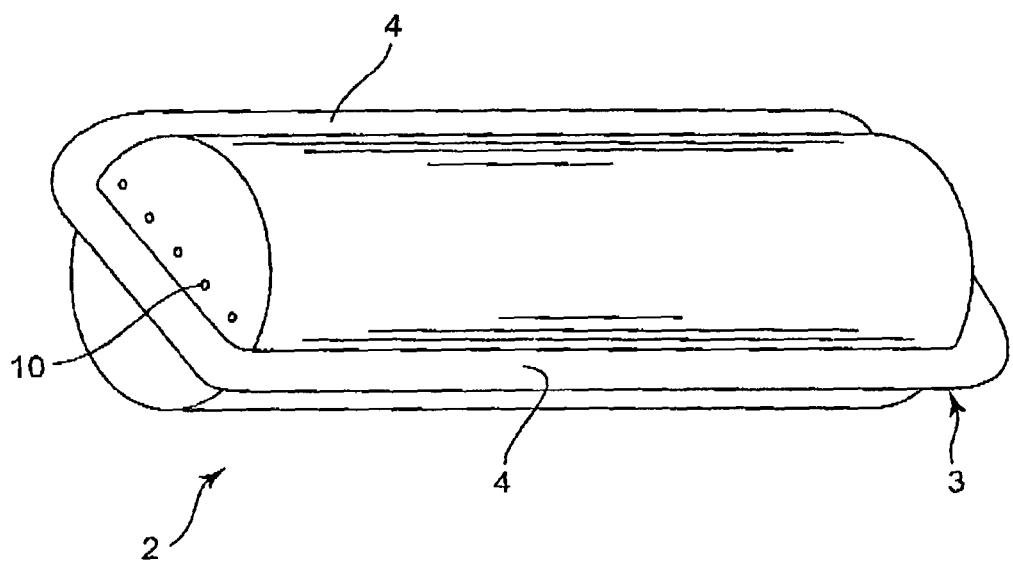
FIG. 2A is a perspective view of a product of the invention wherein an expanded dough is contained within a package having microvents.

According to exemplary products and methods of the invention as illustrated in FIG. 1, a dough 6 as in packaged dough product 2 expands upon proofing, and gases from headspace 8 are expelled from microvents 10. Optionally and as illustrated, little of any headspace remains within package 3 after expansion of dough 6. The expanded dough 6 contacts microvents 10 from the interior side of package 3 and seals microvents 10, preventing any further transmission of gas through microvents 10. FIG. 2 illustrates the dough product 6 in an expanded state, filling the interior space of package 3 and sealing microvents 10 from the interior side of package 3. The dough and interior space of the dough may be designed to produce an internal pressure of the dough within package 3, in the range from 0 to 15 psig, e.g., from 8 to 10 psig. FIG. 2A is a perspective view of packaged dough product 2.

Figure 3:
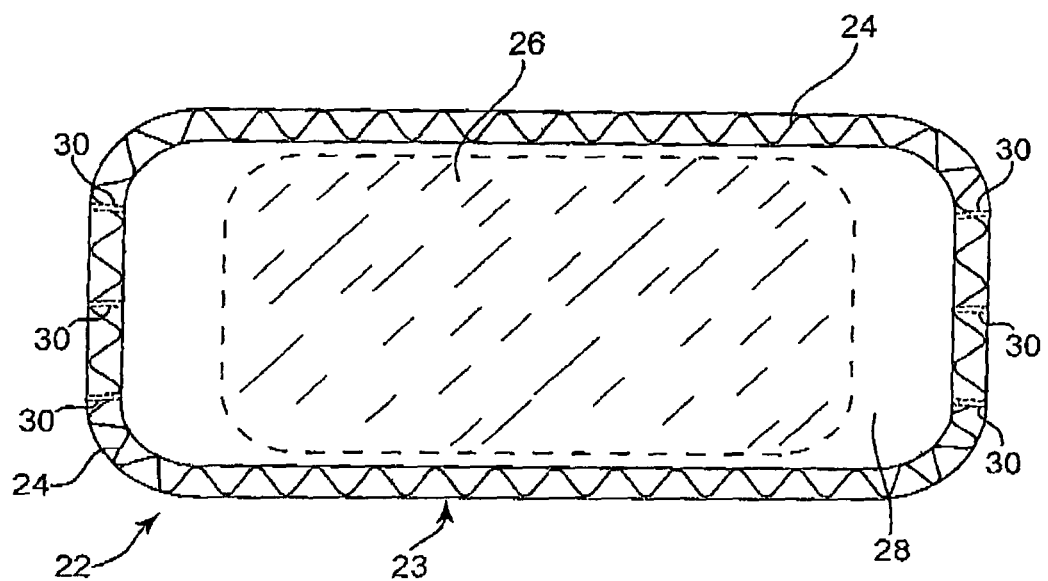
FIG. 3 is a top view of a packaged dough product of the invention, wherein an unproofed dough has been placed in a package having microvents.

Another example of a packaged dough product as described, that includes a flexible packaging material containing microvents (here, in the form of microchannels) containing a dough composition, is at FIG. 3. Packaged dough product 22 includes package 23 of two pieces of flexible film material sealed at seal 24 around the perimeter of package 23. The interior of package 23 includes dough composition 26 (dashed lines and shading) and headspace 28. Microvents 30 are located at the ends of package 23 as microchannels formed between the two pieces of flexible material sealed together to form seal 24. Six microvents (30) (3 at each end of package 23) are illustrated but the number may be more or fewer. Microvents 30 are placed at the ends of package 23 because dough composition 26 is located centrally in package 23, between the ends, and will expand to fill the ends of package 23 last, allowing gas from headspace 28 to be expelled as dough 26 expands to fill the end volumes of package 23. While package 23 is illustrated to be oblong or rectangular, any other shape can be suitable, such as circular, square, etc. Similarly, package 23 includes only a single dough piece, but multiple pieces may be placed in package 23 according to the invention.

Figure 4:
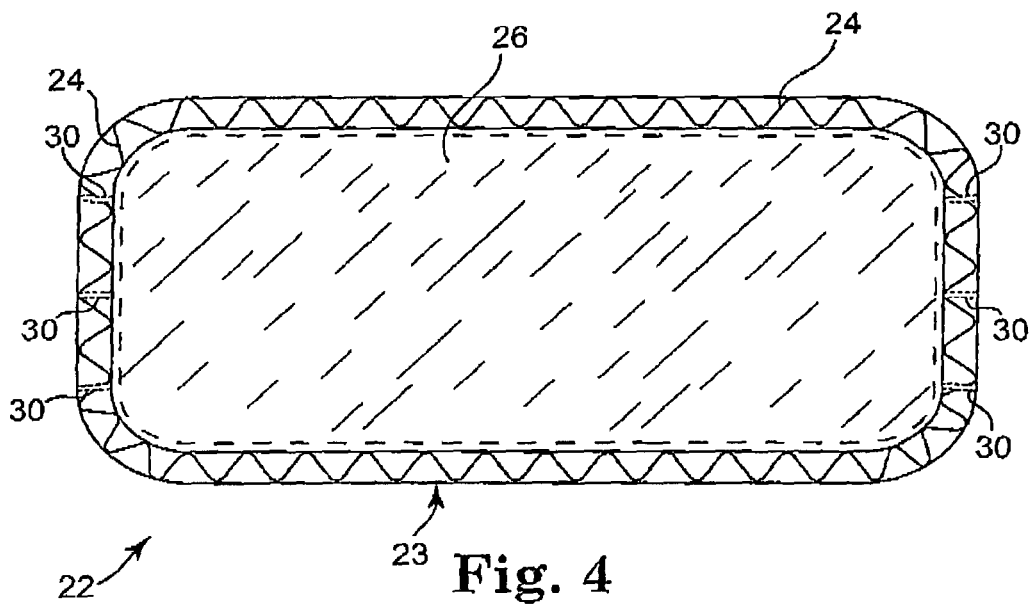
FIG. 4 is a top view of a product of the invention wherein an expanded dough is contained within a package having microvents.

According to products and methods of the invention, a dough 26 as in packaged dough product 22 expands upon proofing, and gases from headspace 28 are expelled through microvents 30. Optionally and as illustrated, little of any headspace remains within package 23 after expansion of dough 26. The expanded dough 26 contacts microvents 30 from the interior side of package 23 and seals microvents 30, preventing any further transmission of gas through microvents 30. FIG. 4 illustrates the dough product 26 in an expanded state, filling the interior space of package 23 and sealing microvents 30 from the interior side of package 23. The dough and interior space of the dough may be designed to produce an internal pressure of the dough within package 23, in the range from 1 to 15 psig, e.g., from 5 to 10 psig.

Figure 5:
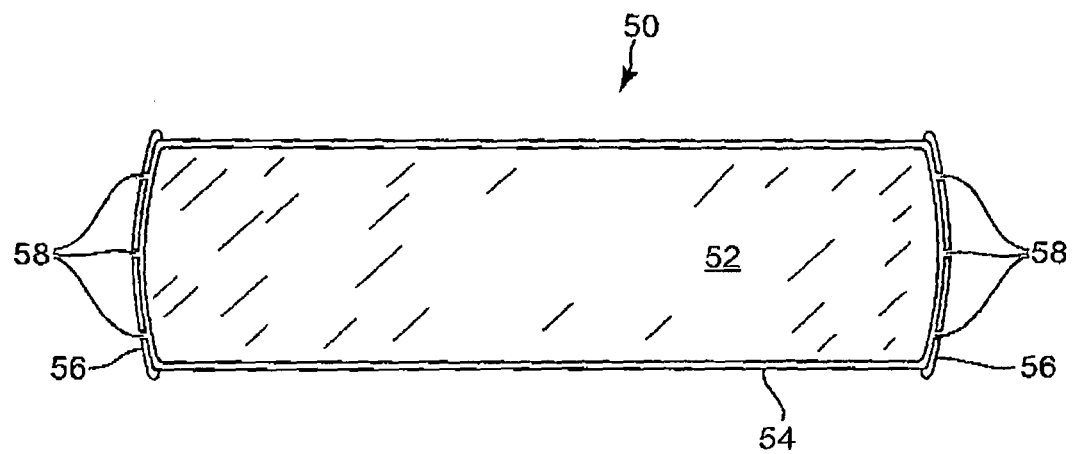
FIG. 5 is a top view of a product of the invention wherein an expanded dough is contained within a package having microvents.

FIG. 5 illustrates an exemplary cylindrical, fixed-volume, can or canister-type dough package, containing an expanded dough composition and microvents. Packaged dough product 50 includes dough 52 contained in fixed-volume cylinder 54, having end caps 56, which contain microvents 58. Cylinder 54 can be a conventional cylinder of wound cardboard, or may alternately be of plastic or another type of packaging material. End caps 56 may be, e.g., metal, plastic or another polymeric material, metallized paper, paper, or the like, and include microvents to allow passage of gas while dough 52 expands within cylinder 54.

Figure 6:
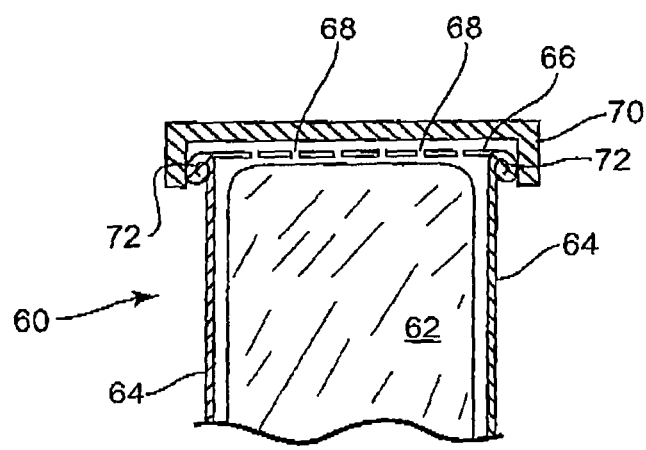
FIG. 6 is a top cut-away view of a product of the invention wherein an expanded dough is contained within a package having microvents.

FIG. 6 illustrates a specific end cap design. Shown is a portion 60 of a packaged dough product comprising fixed volume cylinder 64 and membrane seal 66, which together contain expanded dough composition 62. Membrane seal 66 includes microvents 68, and may be of any material, such as a metal, plastic or another polymeric material, metal foil, plastic foil, paper, rigid or flexible plastic, etc., designed to be removed so that the packaged dough product may be opened by removal of all or a portion of membrane seal 66. Membrane seal 66 can be attached to rim 72 surrounding the perimeter of the end of cylinder 64 by any useful method of attachment, such as by thermal bonding, by use of an adhesive, etc., as will be appreciated based on the present description. Lid 70 is a plastic lid that may optionally be included and that does not seal to rim 72 in an air-tight fashion so that gas may be expelled through microvents 68 and past lid 70.

Figure 7:
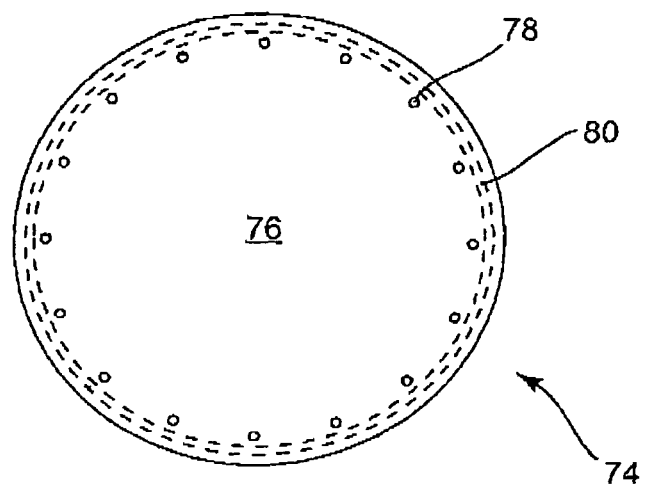
FIG. 7 illustrates an end view of a package according to the present description.

FIG. 7 is an end view of an embodiment of a cylindrical package, such as that of FIG. 6. Package end 74 includes membrane seal 76, which may be a foil, metal, paper, polymer, etc., and which contains microvents 78 near and substantially around the perimeter. Area 80, between the dashed lines, also near and substantially around the perimeter of membrane seal 76, indicates the location of a seal between membrane seal 76 and a rim of a fixed-volume cylinder.

Figure 8:
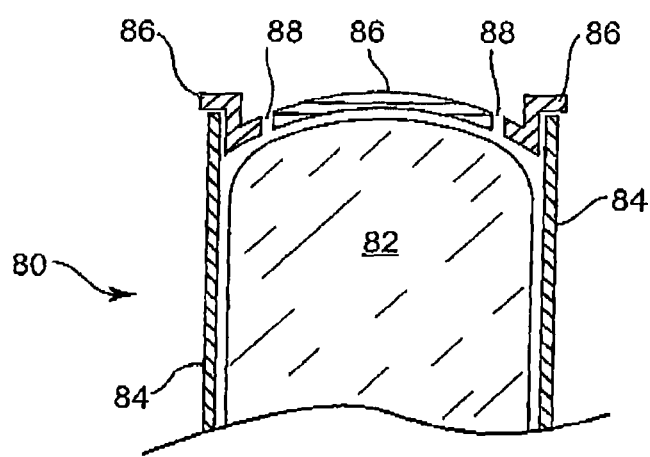
FIG. 8 is a top cut-away view of a product of the invention wherein an expanded dough is contained within a package having microvents.

FIG. 8 illustrates an exemplary cylindrical, fixed-volume, can or canister-type dough package, containing an expanded dough composition and microvents. Packaged dough product 80 includes dough 82 contained in fixed-volume cylinder 84, having membrane seals 86, which contain microvents 88. Cylinder 84 can be a conventional cylinder of wound cardboard, or may alternately be of plastic or another type of packaging material. Membrane seals 86 may be, e.g., metal, plastic or another polymeric material, metallized paper, paper, or the like, and include microvents to allow passage of gas while dough 82 expands within cylinder 84.

Figure 9:
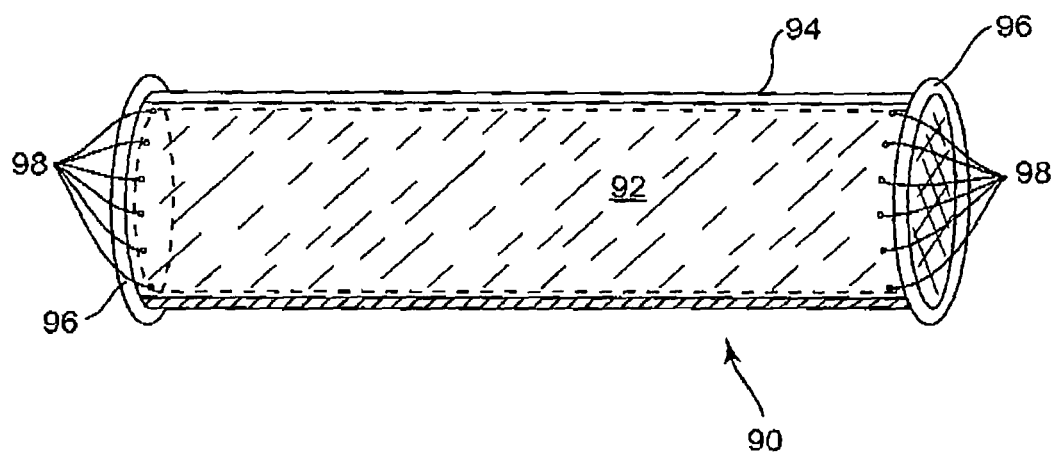
FIG. 9 is a top view of a product of the invention wherein an expanded dough is contained within a package having microvents.

FIG. 9 illustrates an exemplary cylindrical, fixed-volume, can or canister-type dough package, containing an expanded dough composition and microvents. Packaged dough product 90 includes dough 92 contained in fixed-volume cylinder 94, having membrane seals 96. In this embodiment, cylinder 94 includes microvents near each of the two opposing ends of cylinder 90, and around the perimeter. Cylinder 94 can be a conventional may be prepared from any material capable of having microvents 98 formed therein, such as a plastic. Membrane seals 96 may be, e.g., metal, plastic or another polymeric material, metallized paper, paper, or the like.

Figures 10A, 10B:
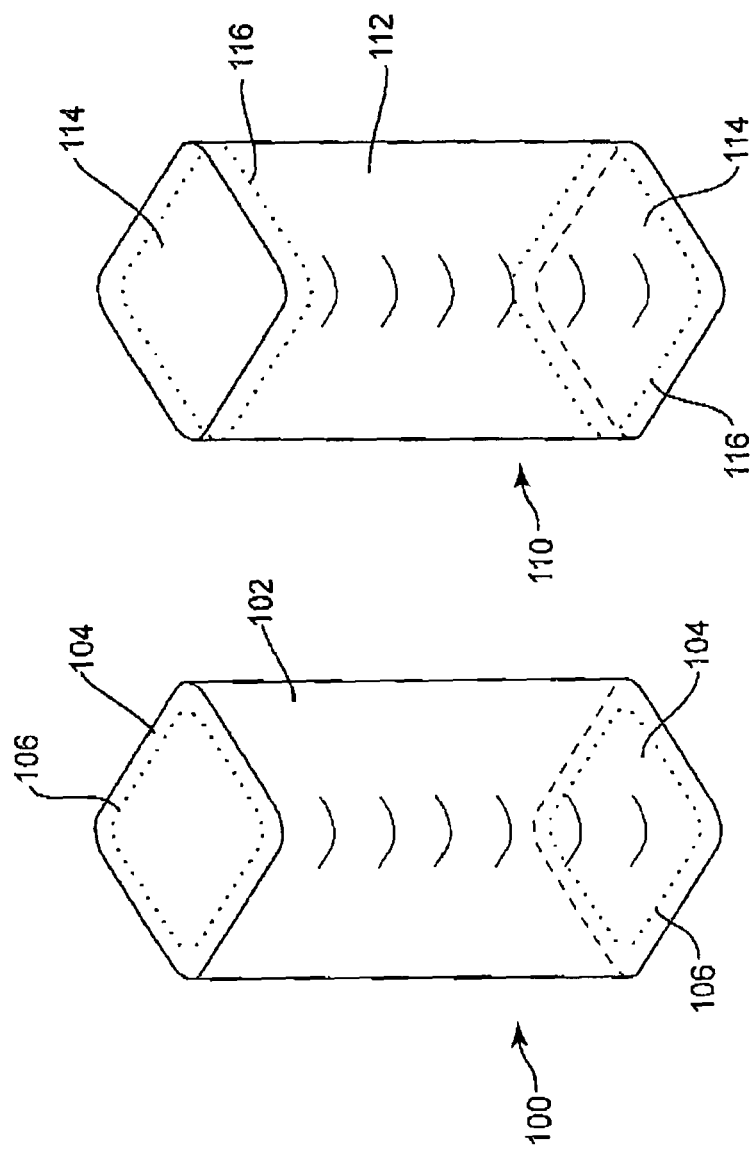
FIGS. 10A and 10B are is top perspective of a product of the invention wherein an expanded dough is contained within a package having microvents.

FIGS. 10A and 10B illustrate an exemplary fixed-volume, rounded edge can or canister-type dough package for containing an expanded dough composition. Each package contains microvents. At FIG. 10A, package 100 includes fixed-volume rounded-edge can (or canister) 102 with ends 104. In this embodiment, package 100 includes microvents 106 as part of ends 104. Alternately, FIG. 10B, shows package 110 having rounded-edge can (or canister) 112 with ends 114 and microvents 116 at each of the two opposing ends of sidewalls of can 112, and around each perimeter. Sidewalls of cans 102 and 112 can be prepared from any material, such as wound cardboard, paper, plastic, polymer, metal, metallized film, etc. Ends 104 and 114 can be prepared from any useful end material such as cardboard, paper, plastic, polymer, metal, metallized film, etc.

A dough of a packaged dough product of the invention may be of any formulation that can expand within a package and contact a microvent, to seal the package from within. The dough generally will have a rheology, formulation (e.g., water content), and texture to allow expansion of the dough inside the package, against the package interior, to contact microvents and not flow through the microvents to the package exterior. The dough may yeast or chemically leavened, and for use according to the invention may desirably include a leavening system that provides predictable leavening and expansion during refrigerated storage.

Examples of useful dough types include developed and non-developed chemically leavened doughs such as bread doughs, pizza doughs, sweet rolls, rolls, etc. Specific formulations of dough compositions that may be useful as doughs within the present description, including chemically leavenable dough formulations, yeast-leavened dough formulations, combinations of yeast and chemically leavened dough formulations. The dough may be a developed dough formulation or a non-developed dough, such as one of those described in any of the following patent applications: U.S. Ser. No. 09/945,204, filed Aug. 31, 2001, titled "CHEMICAL LEAVENED DOUGHS AND RELATED METHODS"; U.S. Ser. No. 10/446,481, filed May 28, 2003, titled "PACKAGED DOUGH PRODUCT IN FLEXIBLE PACKAGE, AND RELATED METHODS"; U.S. Ser. No. 10/273,668, filed Oct. 16, 2002, titled "DOUGH COMPOSITION PACKAGED IN FLEXIBLE PACKAGING WITH CARBON DIOXIDE SCAVENGER"; U.S. Ser. No. 11/132,831, filed May 19, 2005, titled "PACKAGED, NON-DEVELOPED DOUGH PRODUCT IN LOW PRESSURE PACKAGE, AND RELATED COMPOSITIONS AND METHODS"; and U.S. Ser. No. 11/132,826, filed May 19, 2005, titled "PACKAGED, DEVELOPED DOUGH PRODUCTION IN LOW PRESSURE PACKAGE, AND RELATED METHODS".

As stated, the packaged dough product can include any type or formulation of yeast or chemically-leavenable dough composition that expands, such as by production of carbon dioxide, during refrigerated storage. Many if not all formulations of (pre-proofed or unproofed) yeast and chemically-leavenable dough compositions evolve an amount of carbon dioxide prior to or during refrigerated or frozen storage, causing expansion of the dough as presented in this description, within a package having microvents. The invention can be used to avoid bulging of such a packaged dough product by allowing gas contained in the package to escape through the microvents.

The invention does not require that any particular type or formulation of dough composition be used in combination with the described package. Still, the inventive use of a package containing microvents, with an effect of reduced bulging such as during refrigerated storage, has been found to be useful with certain types of chemically-leavenable refrigerated dough compositions, such as dough formulations for refrigerator-stable chemically-leavened developed and non-developed doughs including rolls, sweet rolls, breads, and biscuits.

Yeast and chemically-leavened dough compositions can be prepared from ingredients generally known in the dough and bread-making arts, typically including flour, a liquid component such as oil or water, a leavening agent such as yeast or chemical leavening agents, and optionally additional ingredients such as shortening, salt, sweeteners, dairy products, egg products, processing aids, emulsifiers, particulates, dough conditioners, yeast as a flavorant, flavorings, and the like.

Especially useful dough compositions of the invention are doughs that have predictable or controllable refrigerated leavening properties during refrigerated storage, meaning that the amount of carbon dioxide and attendant dough expansion caused by a leavening system of the dough is understood, predictable, and even controllable, based on formulation. The use of a dough having predictable refrigerated leaving properties allows a packaged dough product to be designed to have a predictable internal package pressure upon expansion of the dough during refrigerated storage. According to inventive methods, a known amount of dough in terms of mass or volume, having predictable expansion properties, can be placed into a package of known volume, and then can expand to an expected raw specific volume and package pressure as a function of the percent dough surface area in contact with the gas barrier package material. With a known internal package volume, and with knowledge or comparisons of empirical relationships between non-expanded and expanded raw specific volumes, refrigerated expansion properties, and internal package volumes, the internal pressure of the package containing the expanded dough can be controlled and predicted to be within a desired range.

As an example, unproofed doughs generally have a raw specific volume within the approximate range of 0.9 to 1.1 cubic centimeters per gram (cc/g). An amount of dough having predictable refrigerated leavening properties can be expected to expand to a desired raw specific volume during refrigerated storage, when allowed to expand within a fixed-volume container. A relevant parameter is the amount of unleavened raw dough volume compared to internal package volume (meaning a fixed or a maximum or "expanded" package volume). According to embodiments of the invention, a volume of unproofed dough per package volume (e.g., having a raw specific volume in the range from 0.9 to 1.1) can be about 50 to 90 percent dough per package volume, such as from 80 to 85 percent dough mass to package volume. With certain doughs of the invention, having predictable refrigerated leavening properties, this ratio of non-expanded dough to maximum package volume has been identified as useful to produce a packaged dough product having an internal pressure of 1 to 15 psig, e.g., 5 to 10 psig, or 8 to 10 psig, after allowing the dough to expand inside of the package to a raw specific volume in the range from 1.5 to 2.0 cc/g, e.g., 1.6 to 1.9 cc/g (when measured within the package).

Optionally, a dough of desired mass to package volume can be packaged to favor expansion of the dough over diffusional loss of leavening gas. A dough surface area can be preferentially placed to contact a dough packaging material instead of free interior space. The dough surface may be placed to contact a package material by any means or method, such as by simple placement of the dough into the package with no special step for contacting, or by rolling the package to contact a contained dough, or by vacuum. Exemplary ranges of dough surface to contact a leavening gas (e.g., carbon dioxide)-impermeable packaging material instead of being exposed, can be at least ⅔ of the dough surface, e.g., at least 80 percent of the dough surface.

Dough compositions that exhibit predictable refrigerated leavening properties can include various types of dough, including doughs formulated with yeast for leavening, chemical leavening systems, or a combination of yeast and chemical leavening systems used for leavening. Doughs may be developed or non-developed types of doughs and dough products. Yeast-leavened doughs can exhibit predictable refrigerated leavening properties based on selection of a yeast that has predictable behavior such as a substrate-limited yeast (in combination with selected substrates), a cold-temperature sensitive yeast, combinations of these types of yeasts, and combinations of these types of yeasts with other ingredients such as a cold-temperature sensitive yeast used in combination with ethanol. Examples of these types of predictable yeasts are described in U.S. Pat. Nos. 5,939,109, 5,798,256, 5,759,596, 5,650,183.

Other examples dough formulations having predictable refrigerated leavening properties can be certain types of chemical leavened doughs, such as those formulated with acidic or basic chemical leavening agents that are specifically chosen to produce a desired effect the timing or amount of leavening during refrigerated storage. Examples of these types of leavening systems are described, for example, in the following patent applications: U.S. Ser. No. 09/945,204, filed Aug. 31, 2001, titled "CHEMICAL LEAVENED DOUGHS AND RELATED METHODS"; U.S. Ser. No. 10/446,481, filed May 28, 2003, titled "PACKAGED DOUGH PRODUCT IN FLEXIBLE PACKAGE, AND RELATED METHODS"; U.S. Ser. No. 10/273,668, filed Oct. 16, 2002, titled "DOUGH COMPOSITION PACKAGED IN FLEXIBLE PACKAGING WITH CARBON DIOXIDE SCAVENGER"; U.S. Ser. No. 11/132,831, filed May 19, 2005, titled "PACKAGED, NON-DEVELOPED DOUGH PRODUCT IN LOW PRESSURE PACKAGE, AND RELATED COMPOSITIONS AND METHODS"; and U.S. Ser. No. 11/132,826, filed May 19, 2005, titled "PACKAGED, DEVELOPED DOUGH PRODUCTION IN LOW PRESSURE PACKAGE, AND RELATED METHODS."

Chemically-leavenable (also referred to as "chemically-leavened") dough compositions are dough compositions that leaven to a substantial extent by the action of chemical ingredients that react to produce a leavening gas. Typically the ingredients include a basic chemical leavening agent and an acidic chemical leavening agent that react to produce carbon dioxide, which, when retained by the dough matrix, causes the dough to expand.

Acidic chemical leavening agents are generally known in the dough and bread-making arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). Optionally, an acidic chemical leavening agent for use according to the invention (either soluble or insoluble), can be encapsulated. Optionally, a combination of acidic agents can be useful to produce desired leavening properties; e.g., a dough formulation may include a soluble acidic agent to produce a desired (predictable) amount of leavening and expansion of a dough during refrigerated storage, and an amount of low solubility acidic agent can be included to produce additional expansion during baking.

Soluble acidic chemical leavening agent is considered to be soluble in a liquid (e.g., aqueous) component of the dough composition, at a temperature used during processing (e.g., from 40 to about 72° F. (4.4 to about 22.2° C.)) or refrigerated storage (e.g. from about 32 to about 55° F. (0 to about 12.8° C.)). A soluble acidic chemical leavening agent is an acidic agent that is sufficiently soluble to dissolve in a dough composition at a temperature within processing and refrigerated storage ranges to react with a basic chemical agent if available, e.g., is freely soluble or will substantially entirely dissolve. Particularly useful soluble acidic chemical leavening agents include glucono-delta-lactone and sodium acid pyrophosphate (SAPP) of a moderate to high solubility e.g., SAPP 60, SAPP 80, as well as other acidic chemical leavening agents that exhibit similar solubility behavior.

Soluble acidic chemical leavening agent can be present in an amount that provides refrigerated stability, desired refrigerated raw specific volume, and desired baked leavening properties following refrigerated storage. Exemplary amounts of soluble acidic agent can be included to provide a raw specific volume in the range from 1.5 to 2.0 grams per cubic centimeter upon expansion during refrigerated storage, as well as a desired baked specific volume upon baking, such as a baked specific volume in the range from 3.0 to 4.5.

Insoluble acidic chemical leavening agent refers to acidic chemical leavening agents that are not substantially soluble at a processing or refrigeration temperature, but are insoluble or only slightly soluble at processing and refrigerated storage temperatures, and that are substantially soluble at temperatures that a dough reaches during baking (e.g., early baking). Insoluble acidic chemical leavening agents include sodium aluminum phosphate (SALP) and other acidic chemical leavening agents that have solubility properties that are similar to SALP.

A combination of soluble and insoluble acidic agents may be useful to produce a combination of desired raw and baked specific volumes. A desired raw specific volume can result from the soluble acidic agent reacting to produce a desired amount of leavening gas during processing or refrigerated storage. A desired baked specific volume can result from the insoluble acidic agent reacting to produce an amount of leavening gas during baking.

The total amount of acidic chemical leavening agent included in a dough composition can be an amount that is useful to prepare a dough composition having desired raw and baked specific volumes, and desirable expansion properties for use within a package of this description. An amount of acidic agent that is stoichiometric to the amount of basic agent can be useful, as well as amounts that are above and below a stoichiometric amount. Amounts of acid or base leavening agents are sometimes used in amounts based on neutralization value, which is the amount of base (by weight) neutralized by 100 parts by weight leavening acid. Amounts of soluble and insoluble acidic agents can be in the range from 40:60 to 60:40, based on neutralization values. Specific exemplary ranges of useful amounts of total acidic chemical leavening agent (e.g., soluble acidic agent, insoluble acidic agent, or a combination of these), can be in the range from about 0.5 to about 2.75 weight percent based on the total weight of a dough composition, including the range from about 0.75 to about 2.25 weight percent, based on total weight of a dough composition.

The dough composition also includes basic chemical leavening agent, such as an encapsulated basic chemical leavening agent. Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc. These and similar types of basic chemical leavening agents are generally freely soluble in an aqueous component of a dough composition at processing and refrigerated storage temperatures.

The amount of basic chemical leavening agent used in a dough composition may be sufficient to react with the included acidic chemical leavening agent to release a desired amount of gas for leavening, thereby causing a desired degree of expansion of the dough product. Exemplary amounts of basic chemical leavening agent such as sodium bicarbonate may be in the range from about 0.2 or 0.25 to about 1.5 weight percent based on the total weight of a dough composition, including the range from about 0.75 to about 1.25 weight percent based on total weight of a dough composition. (As used throughout this description and claims, unless otherwise noted, amounts of basic chemical leavening agents and encapsulated basic chemical leavening agents are given in terms of the amount of active basic agent, not including the weight of any encapsulant or barrier material.)

Encapsulated basic chemical leavening agents are generally known, and can be prepared by methods known in the baking and encapsulation arts. An example of a method for producing enrobed particles is the use of a fluidized bed.

A dough for use in the invention, whether chemically or yeast-leavened, developed, or non-developed, can contain other ingredients generally known in the dough and bread-making arts, typically including flour, a liquid component such as oil or water, sugar (e.g., glucose), chemical leavening agents as described, and optionally additional ingredients such as shortening, salt, dairy products, egg products, processing aids, emulsifiers, particulates, dough conditioners, yeast as a flavorant, other flavorings, etc. Many dough formulations are known to those skilled in the dough and baking arts and are readily available to the public in commercial cookbooks.

Dough compositions described herein can be prepared according to methods and steps that are known in the dough and dough product arts. These can include steps of mixing or blending ingredients, folding, lapping with and without fat or oil, forming, shaping, cutting, rolling, filling, etc., which are steps well known in the dough and baking arts.

The invention claimed is:
1. A refrigerated packaged raw dough product comprising a raw dough composition contained in a package, the package comprising microvents, wherein
    the microvents allow gas to be expelled from the package during expansion of the dough inside the package,
    the microvents seal from the inside by contact with the dough in an expanded state, with raw dough being exposed to an exterior of the package at the microvents,
    the microvents exhibit a diameter in a range from 0.002 inches to 0.016 inches;

wherein the refrigerated product can be stored for four weeks at refrigerated temperature during which the raw dough exposed to the exterior at the microvents becomes dry and mold does not grow on the raw dough exposed to the exterior at the microvents; and wherein the package comprises flexible film, and the microvents comprise apertures in the flexible film.

2. The product of claim 1 wherein the dough comprises a raw chemically-leavened dough.

3. The product of claim 1 wherein
the package has an internal pressure in the range from 1 to 15 pounds per square inch, gauge.

4. The product of claim 1 wherein the package comprises an elongate flexible tube, chub, cylinder, or pouch, having less than 1 percent headspace.

5. The product of claim 1 wherein the microvents are located on the package at locations to allow expansion of the raw dough within the package to expand into the internal volume of the package with substantially no headspace.

6. The product of claim 1 wherein the package has a cylindrical shape having two ends, and the microvents are located adjacent to an end of the cylindrical shape.

7. The product of claim 1 wherein the package has a cylindrical shape having two ends, and the microvents are located at an end of the cylindrical shape.

8. The product of claim 1 wherein the microvents are located within 20% of the total length of a length-wise dimension of the package, from an end of the package.

9. The product of claim 1 wherein the microvents are located within 10% of the total length of a length-wise dimension of the package, from an end of the package.

10. The product of claim 1 wherein the microvents are located within 5% of the total length of a length-wise dimension of the package, from an end of the package.

11. The product of claim 1 wherein the package has less than 5 percent headspace.

12. The product of claim 1 wherein the package has less than 1 percent headspace.

* * * * *